(12) United States Patent
Versteeg et al.

(10) Patent No.: US 7,927,403 B2
(45) Date of Patent: Apr. 19, 2011

(54) METHOD FOR ABSORPTION OF ACID GASES

(75) Inventors: Geert Frederil Versteeg, Enschede (NL); Paramasivam Senthil Kumar, Enschede (NL); Johannes Antonius Hogendoorn, Enschede (NL); Paul Hubert Maria Feron, Apeldoorn (NL)

(73) Assignee: Nederlandse Organisatie voor Natuurwetenschappelijk Onderzoek TNO, Delft (NL)

( * ) Notice: Subject to any disclaimer, the term of this patent is extended or adjusted under 35 U.S.C. 154(b) by 806 days.

(21) Appl. No.: 10/513,657

(22) PCT Filed: May 7, 2003

(86) PCT No.: PCT/NL03/00337
§ 371 (c)(1),
(2), (4) Date: Aug. 9, 2005

(87) PCT Pub. No.: WO03/095071
PCT Pub. Date: Nov. 20, 2003

(65) Prior Publication Data
US 2006/0117954 A1    Jun. 8, 2006

(30) Foreign Application Priority Data

May 8, 2002  (NL) ...................................... 1020560

(51) Int. Cl.
*B01D 53/14* (2006.01)
(52) U.S. Cl. ................. 95/235; 95/210; 95/213; 95/236; 423/228
(58) Field of Classification Search ..................... 95/236, 95/210, 213, 2, 213.2; 423/228
See application file for complete search history.

(56) References Cited

U.S. PATENT DOCUMENTS

| | | | | |
|---|---|---|---|---|
| 1,771,153 A | * | 7/1930 | Uhlig et al. | 423/225 |
| 1,945,163 A | * | 1/1934 | Rosenstein et al. | 423/223 |
| 1,990,217 A | * | 2/1935 | Baehr et al. | 423/226 |
| 2,176,441 A | * | 10/1939 | Ulrich et al. | 423/228 |
| 3,042,483 A | * | 7/1962 | Wolfram et al. | 423/437.1 |
| 3,660,016 A | * | 5/1972 | John et al. | 423/226 |
| 5,749,941 A | * | 5/1998 | Jansen et al. | 95/44 |

* cited by examiner

*Primary Examiner* — Duane Smith
*Assistant Examiner* — Ives Wu
(74) *Attorney, Agent, or Firm* — Browdy and Neimark, PLLC

(57) ABSTRACT

The invention relates to a method for the absorption of acid gases, such as $CO_2$ and $H_2S$, from gas mixtures. According to the invention, acid gases are absorbed from a gas mixture by contacting this gas mixture with a liquid in which is dissolved so high a concentration of an amino acid or a salt thereof that a precipitate is formed. The contact takes place in a column of the packing-free type or a column suitable for processing slurries.

9 Claims, 1 Drawing Sheet

METHOD FOR ABSORPTION OF ACID GASES

FIELD OF THE INVENTION

Figure 1:
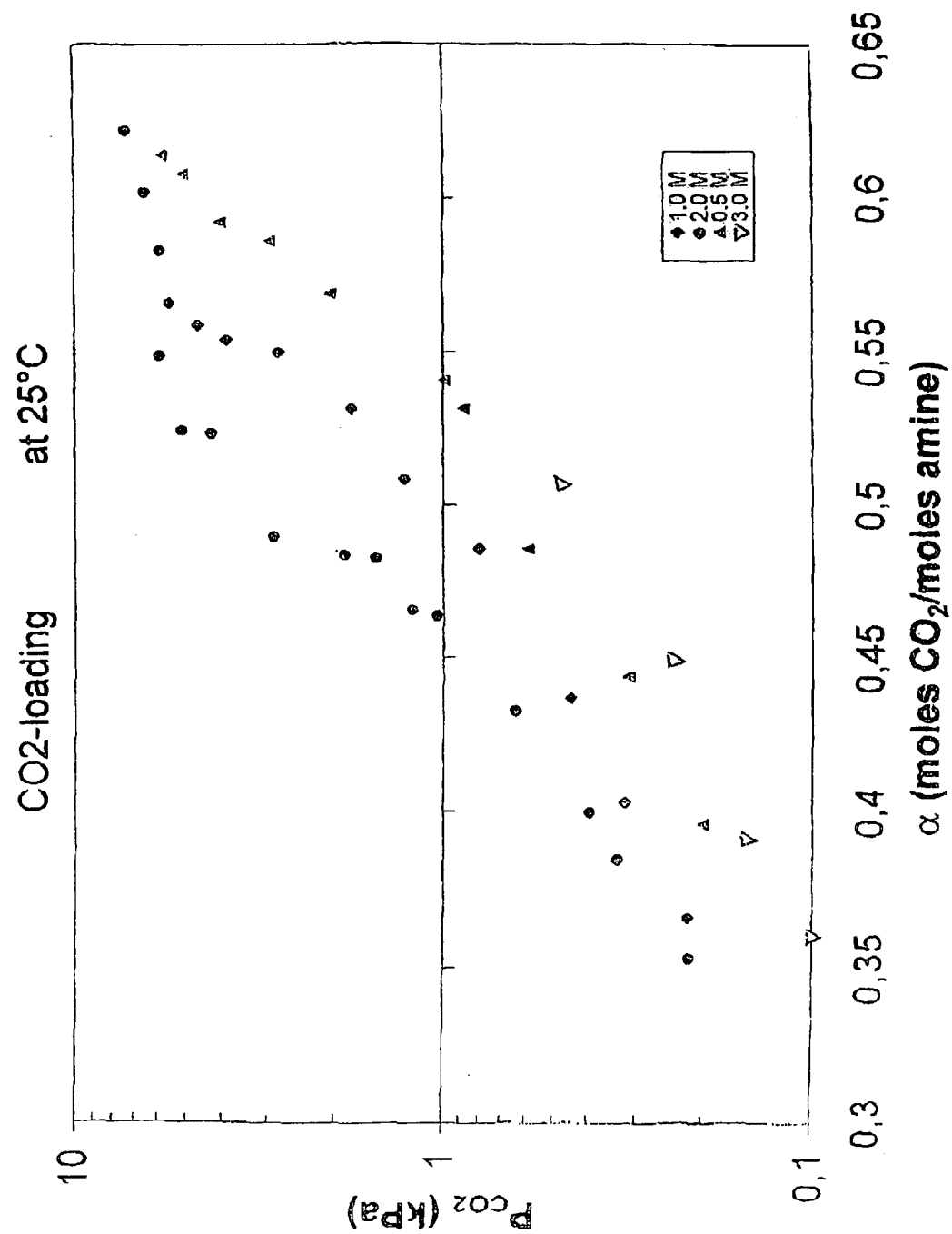

The invention relates to a new method for the absorption of acid gases, such as $CO_2$ and $H_2S$, from gas mixtures.

BACKGROUND OF THE INVENTION

Emission of acid gases is detrimental to the environment. $CO_2$ causes the so-called greenhouse effect. $H_2S$ is damaging to health, causes stench nuisance and can form acid rain. In the state of the art, many methods for selectively removing acid gases from gas mixtures have already been described. A frequently used method is a gas treatment process in which the acid gases are absorbed in a liquid. Also, it has long since been known (for instance from U.S. Pat. No. 1,990,217, U.S. Pat. No. 2,176,441 and U.S. Pat. No. 3,042,483) that weakly acid gases, such as $CO_2$, can be removed from gas mixtures by washing with a solution of imino acids, amino acids or tertiary N-acids or salts thereof. These publications show that, preferably, solutions with a high concentration of these acids or salts should be taken up. However, at high concentrations it is experienced as a drawback that precipitates of the acids, salts and/or reaction products are formed.

An adapted method for absorption of $CO_2$ is described in U.S. Pat. No. 5,749,941, in which the gas mixture and the absorption liquid (i.e. a solution of amino salts) are separated by a hydrophobic membrane over which the gas exchange takes place. Here, too, a high concentration of amino salts is preferable, but physically impossible, because precipitation of the amino acids causes clogging of the membrane.

SUMMARY OF THE INVENTION

Now the invention comprises a method for absorbing acid gases from a gas mixture by contacting this gas mixture with a liquid in which is dissolved so high a concentration of an amino acid or a salt thereof that the amino acid or one of the other reaction products crystallizes after reaction with the acid gas components, characterized in that the contact takes place in a column of the packing-free type or a column with a packing suitable to be driven with slurries.

An advantage of this method is that higher concentrations of amino acids or amino salts are possible, so that a higher loading of the absorption liquid becomes possible. Besides, the $CO_2$ equilibrium pressure rises with the loading, also in a solution in which precipitate is formed.

The reaction of the amino acids or amino salts in solution with the passed-through $CO_2$ proceeds according to the following reaction scheme:

$$2RNH_2 + CO_2 \rightarrow RNHCO_2^- + RNH_3^+ \quad (1)$$

in which half of the amino acid present in the solution reacts with $CO_2$ to form carbamate. At sufficiently high concentration the amino acid will crystallize ($RNH_3^+\downarrow$), so that the equilibrium of reaction (1) will shift to right. Besides, the carbamate formed can undergo hydrolysis according to:

$$RNHCO_2^- + H_2O \rightarrow HCO_3^- + RNH_2 \quad (2)$$

wherein the bicarbonate formed can form salts, which also precipitate.

The reaction with $H_2S$ proceeds analogously:

$$RNH_2 + H_2S \rightarrow HS^- + RNH_3^+ \quad (3)$$

In this case, too, the amino acid ($RNH_3^+$) will crystallize. The bisulfide (HS-) remains in solution.

The drawback as described in the state of the art in that a precipitate of amino acid is formed is removed according to the invention by allowing this reaction to take place in a column in which the precipitate cannot cause damage to packings or other construction material. Thus, the reaction should preferably take place in a column without packings, for instance a spray column or a plate column.

It is thus possible to readily remove from the column the precipitate formed as a slurry on the bottom of the column, to optionally degas it outside the column and to return it as purified amino acid to the initial solution.

According to the present invention, a much higher concentration of the amino salt in the solution is possible, and consequently, more $CO_2$ can be stripped from the gas phase. This effect is enhanced because the equilibrium of the reaction shifts to right.

Also, the $CO_2$ can be readily removed outside the column from the $CO_2$-saturated liquid (with any crystallized, but not yet precipitated amino acid).

The regeneration step may, for instance, be carried out by a direct regeneration of the slurry. In this direct regeneration, the temperature of the slurry is increased so that, on the one hand, the $CO_2$ goes out of solution and, on the other hand, the precipitate goes into solution again. Both processes strengthen each other. Even if the temperature is not increased, this process proceeds, if slowly. This embodiment of the regeneration step is particularly favorable if the precipitate consists of bicarbonate or a carbonate compound, because $CO_2$ is then bound in the precipitate.

Another possibility of carrying out the regeneration step is separation of the slurry into a liquid fraction containing $CO_2$ and a thickened liquid containing the amino acid, so that the regeneration step can be carried out with a smaller amount of liquid, which results in a saving of energy. The liquid may be subjected to a thermic regeneration. This embodiment is particularly suitable if the precipitate consists essentially of precipitated amino acids.

Because outside the column no $CO_2$ vapor tension is present above the liquid, the $CO_2$ will diffuse from the liquid via the reverse reaction of (1). The crystallized amino acid will thus go into solution again and cause the equilibrium of the reaction (1) to shift further to left, in which process more $CO_2$ will be removed from the carbamate and will diffuse from the liquid. This process can be accelerated by heating the liquid. The effects of heating are double: a higher driving force for desorption is obtained, and faster reactions and a faster substance transfer occur when the temperature rises. The thus $CO_2$-depleted uranium can then be returned to the column again.

DETAILED DESCRIPTION OF THE INVENTION

As amino salts, all conventional water-soluble salts of amino acids can be used. Amino acids are defined herein as all organic substances which contain one or more amine groups and one or more carboxylic acid groups or sulfonic acid groups. The acid groups can be bound to one and the same atom of the organic substance (as is the case with the naturally occurring amino acids) or to different atoms. Preferably used are amino acids of which the amine group is removed from the acid group by at least two or more atoms, such as carbon atoms.

Amino acids according to the invention can be subdivided into amino acids not having an internal steric hindrance (with respect to the accessibility for the amine group) and the amino acids having an internal steric hindrance. To remove only $CO_2$, the amino acids without steric hindrance are preferably used, because they react with $CO_2$ according to reaction (1). Examples of non-sterically hindered amino acids according to the invention are taurine, methyl taurine, methyl-α-aminopropionic acid, N-(β-ethoxy)taurine and N-(β-aminoethyl) taurine, as well as all other amino acids described in U.S. Pat. No. 3,042,483, which publication is inserted herein by reference, as far as the description of these compounds is concerned.

In the case of sterically hindered amino acids, the absorption of $CO_2$ goes via the formation of bicarbonate according to the following reaction mechanism:

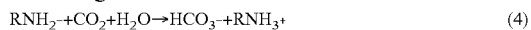  (4)

Here, too, the precipitate formation offers the advantage that the equilibrium of the reaction shifts to right and that thus, on balance, more $CO_2$ will be absorbable. Besides, the bicarbonate can form salts, which also precipitate.

If the gas mixture to be cleaned contains both $H_2S$ and $CO_2$, a sterically hindered amino acid is advantageously used. Because $H_2S$ reacts faster than $CO_2$ with the amino acid, kinetic selectivity is obtained with respect to $H_2S$. The reaction terminates through the crystallization, and the amino acid crystals can be filtered off, while the remaining bisulfide solution can be processed further, for instance electrochemically or oxidatively. The amino acid can be reused, without the necessity of subjecting it to a thermic regeneration step. As a result, no special requirements need to be imposed on the amino acid with respect to the thermic stability.

Examples of sterically hindered amino acids are the naturally occurring amino acids (the amino acids which are part of naturally occurring proteins), in which the accessibility of the amino group is limited by the presence of a carboxylic acid group at the same C atom. Examples thereof are analine and glycine and derivatives thereof, such as N-methyl analine and dimethyl glycine. Aqueous solutions with such amino acids are commercially available under the tradenames of Alkazyd N (analine), Alkazyd M (N-methyl analine) and Alkazyd di-K (dimethyl glycine). It is also possible to use amino acids containing several amine groups per molecule, such as asparagine, glutamine, lysine and histidine.

The sterically hindered amino acids and their salts will absorb the $CO_2$ in a ratio of 1 mol $CO_2$ per mol amino group; with the non-sterically hindered amino acids and their salts the ratio is 0.5:1 because of the carbamate remaining in solution. However, the non-sterically hindered amino acids and salts offer the advantage that they generally have a lower binding energy for $CO_2$ and are thus easier to regenerate.

The amino salts are preferably salts with potassium or sodium, potassium being preferred.

Preferred for the invention are solutions of amino salts, because they are more soluble at a higher concentration than the corresponding amino acid. Preferably used are concentrations at which the salt is soluble, but at which the corresponding amino acid crystallizes as a result of the reaction with the $CO_2$. With the aid of, for instance, NaOH or KOH, the pH of the solution of the salt will be brought to an alkaline value, preferably a pH of 9-13, because the alkaline environment provides the availability of the amino groups in a free, that is to say non-protonated form.

Preferably used is a solution of potassium taurate in which the solution contains a concentration of more than 0.2 mol/l of the salt.

EXAMPLE

Solutions of 0.5, 1.0, 2.0, 3.0 and 4.0 M potassium taurate were prepared by neutralizing the corresponding amino acid (taurine, Merck) dissolved in deionized water with a slightly less than equimolar, known amount of KOH (Merck). The remaining amount of KOH was added by potentiometrically titrating the solution using an aqueous KOH solution of known strength. The adjusted concentrations were verified by means of back titration of samples of the solutions with standard HCl solutions. The solutions (in each case about 500 ml) were tested in a double-walled glass vessel (content about 1.6 $dm^3$), a dilute $CO_2$ gas stream flowing through the solution under vigorous agitation. The concentration of $CO_2$ was varied from 0-6.0 vol. % to carry out the measurements shown in FIG. 1. The tests were carried out at a temperature of 25° C. The $CO_2$ concentration was continuously measured by means of an IR gas analyzer, during which switching was effected between effluent and feed. Each test was carried out until equilibrium was attained (inlet and outlet $CO_2$ concentration equal).

FIG. 1 shows the amount of absorbed $CO_2$ expressed in mol $CO_2$ per mol amine (α) plotted against the partial $CO_2$ tension of the superjacent atmosphere expressed in kPa. Visible is that the measurements belonging to the concentrations of 0.5 and 1.0 M salt get satisfied at an α of respectively 0.55 and 0.6. This is explainable because the amine is responsible for an absorption of 0.5 Mol $CO_2$ per mol amine, the residual value of α being explained because $CO_2$ also itself partially dissolves in water. With the 2M solution, flattening of the curve takes place at an α of 0.55, which is explained because at that moment the taurine in the solution crystallizes so that a virtually higher loading proves possible. With the solutions of 3 and 4M salt, crystallization occurs already earlier, and α=0.5 is reached while a partial $CO_2$ tension has hardly been attained yet.

This shows that through the crystallization of the amino acid a higher $CO_2$ loading is possible.

The invention claimed is:

1. A method for absorbing acid gases from a gas mixture by contacting this gas mixture with a liquid in which is dissolved so high a concentration of an amino acid or a salt thereof that a precipitate is formed, characterized in that the contact takes place in a column of the packing-free type or a column suitable for processing slurries, wherein the precipitate formed as a slurry on the bottom of the column is regenerated.

2. A method according to claim 1, characterized in that the packing-free column is a spray column or a plate column.

3. A method according to claim 1, wherein the gas mixture to be cleaned contains $H_2S$ and $CO_2$ and wherein said amino acid or salt thereof is a sterically hindered amino acid or salt thereof.

4. A method according to claim 1, characterized in that the salt of the amino acid is potassium taurate.

5. A method according to claim 4, characterized in that the concentration of the potassium taurate is greater than 0.2 M.

6. The process according to claim 1 wherein the concentration of the amino acid or salt thereof is at least 2.0 M.

7. The process according to claim 6 wherein the concentration of the amino acid or salt thereof is at least 3.0 M.

8. The method according to claim 1 wherein the pH of the liquid is from 9 to 13.

9. The method according to claim 1 wherein the amino acid is selected from the group consisting of taurine, methyl taurine, methyl-α-aminopropionic acid N-(β-aminoethyl) taurine, glycine, dimethylglycine, glycol, sarcosine, β-alanine and mixtures thereof.

* * * * *